United States Patent [19]
Suzuki

[11] Patent Number: 6,041,231
[45] Date of Patent: Mar. 21, 2000

[54] MOBILE COMMUNICATION SYSTEM WITH ROAMING FUNCTION

[75] Inventor: Hirokazu Suzuki, Yamato, Japan

[73] Assignee: Kabushiki Kaisha Toshiba, Kanagawa, Japan

[21] Appl. No.: 08/887,409

[22] Filed: Jul. 2, 1997

[30] Foreign Application Priority Data

Jul. 3, 1996 [JP] Japan ................................. 8-173811

[51] Int. Cl.⁷ .................................................. H04Q 7/20
[52] U.S. Cl. .................... 455/422; 455/426; 455/435; 455/552; 455/465
[58] Field of Search ................................. 455/422, 432, 455/434, 426, 435, 436, 450, 455, 462, 464, 500, 510, 514, 552, 465

[56] References Cited

U.S. PATENT DOCUMENTS

| | | |
|---|---|---|
| 4,833,701 | 5/1989 | Comroe et al. |
| 4,833,702 | 5/1989 | Shitara et al. ........................ 455/435 |
| 4,876,738 | 10/1989 | Selby ................................... 455/435 |
| 4,879,740 | 11/1989 | Nagashima et al. ................... 455/432 |
| 5,101,500 | 3/1992 | Marui ..................................... 455/33 |
| 5,335,262 | 8/1994 | Oguchi et al. ........................ 455/432 |
| 5,621,785 | 4/1997 | Norimatsu ............................. 455/422 |
| 5,761,618 | 6/1998 | Lynch et al. .......................... 455/432 |
| 5,790,955 | 8/1998 | Tomoike . | |
| 5,802,477 | 9/1998 | Mizokami et al. .................... 455/525 |

FOREIGN PATENT DOCUMENTS

| | | | |
|---|---|---|---|
| 0 462 727 A2 | 12/1991 | European Pat. Off. | H04Q 7/04 |
| 0 472 349 A2 | 2/1992 | European Pat. Off. | H04B 7/26 |
| 0 497 203 A2 | 8/1992 | European Pat. Off. | H04Q 7/04 |
| 97/08912 | 3/1997 | WIPO | H04Q 7/38 |

*Primary Examiner*—Paul Loomis
*Assistant Examiner*—Binh K. Tieu
*Attorney, Agent, or Firm*—Limbach & Limbach, LLP

[57] ABSTRACT

In a mobile communication system of this embodiment, when a terminal device starts communications using a system that does not register the terminal device, it transmits a temporary use registration request to an exchange apparatus after it confirms based on message information from the exchange apparatus that use registration is permitted. Upon reception of the temporary use registration request, the exchange apparatus authenticates the request source terminal device, and thereafter, supplies the terminal identification number of the own system to the terminal device. In addition, the exchange apparatus stores the supplied terminal identification number in correspondence with the home terminal identification number of the request source terminal device, so as to process incoming/outgoing traffic or calls associated with the terminal device on the basis of the stored information.

32 Claims, 15 Drawing Sheets

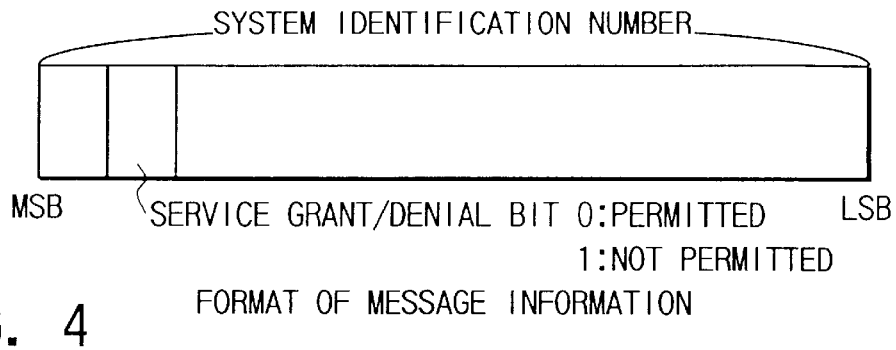
FIG. 4    FORMAT OF MESSAGE INFORMATION
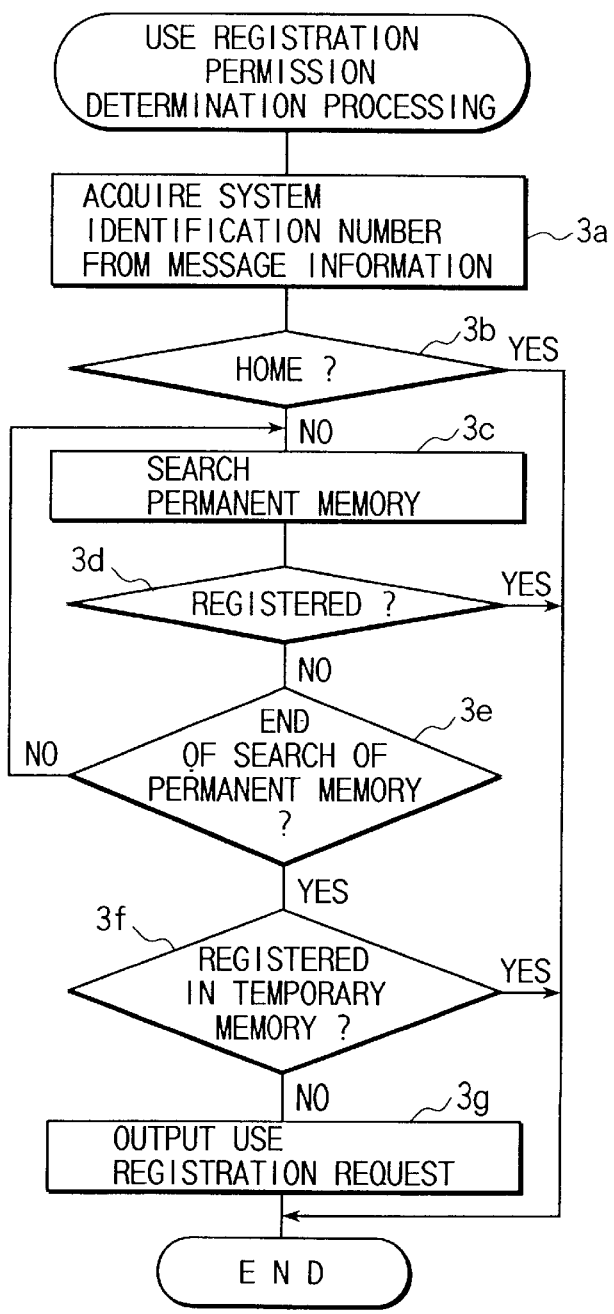
FIG. 6

TERMINAL INFORMATION STORAGE TABLE

| TERMINAL IDENTIFICATION NUMBER | POSITION INFORMATION | SERVICE CLASS | IN USE/ UNUSED | TERMINAL IDENTIFICATION NUMBER OF HOME SYSTEM |
|---|---|---|---|---|
| 4000 | AREA 1 | 1 | IN USE | — |
| 4001 | AREA 2 | 1 | IN USE | — |
| 4002 | AREA 1 | 2 | IN USE | 03-1234-5678 |
| 4003 | AREA 3 | 2 | IN USE | 050-876-5432 |
| 4004 | — | — | UNUSED | — |
| ⋮ | ⋮ | ⋮ | ⋮ | ⋮ |

FIG. 12

TRAFFIC INFORMATION STORAGE TABLE

| AREA NUMBER | CS GROUP | TRAFFIC | | |
|---|---|---|---|---|
| | | SERVICE CLASS 1 | SERVICE CLASS 2 | TOTAL |
| AREA 1 | CS11 | 0.1 | 0 | 0.1 |
| | CS12 | 0.2 | 0.3 | 0.5 |
| AREA 2 | CS13 | 0.1 | 0 | 0.1 |
| | CS14 | 0.3 | 0.3 | 0.6 |
| | CS15 | 0.1 | 0 | 0.1 |
| ⋮ | ⋮ | ⋮ | ⋮ | ⋮ |

FIG. 13

TRAFFIC CAPACITY STORAGE TABLE

| CAPACITY TYPE | LEVEL 1 | LEVEL 2 |
|---|---|---|
| CAPACITY IN UNITS OF AREAS | LOWER-LIMIT VALUE | UPPER-LIMIT VALUE |
| CAPACITY IN UNITS OF CS | LOWER-LIMIT VALUE | UPPER-LIMIT VALUE |
| CAPACITY IN UNITS OF SERVICE CLASS | LOWER-LIMIT VALUE | UPPER-LIMIT VALUE |

FIG. 14

SERVICE TIME BLOCKING
INFORMATION TABLE

| SERVICE TIME | 10:00 ~ 19:00 |
|---|---|
| NON-SERVICE TIME | 19:00 ~ 10:00 |

FIG. 17

SERVICE AREA CALL ORIGINATION/TERMINAL
BLOCKING INFORMATION TABLE

| SERVICE AREA | PLACE | SERVICE PROVIDED |
|---|---|---|
| AREA 1 | 1F ELEVATOR HALL | CALL TERMINATION/ORIGINATION PERMITTED |
| AREA 2 | 1F OFFICE ROOM | CALL ORIGINATION BLOCKED |
| AREA 3 | 1F MEETING ROOM | CALL TERMINATION/ORIGINATION BLOCKED |
| AREA 4 | 2F ELEVATOR HALL | CALL TERMINATION/ORIGINATION PERMITTED |
| AREA 5 | 2F OFFICE ROOM | CALL ORIGINATION BLOCKED |
| AREA 6 | 2F MEETING ROOM | CALL TERMINATION/ORIGINATION BLOCKED |
| ⋮ | ⋮ | ⋮ |

FIG. 18

MOBILE COMMUNICATION SYSTEM WITH ROAMING FUNCTION

BACKGROUND OF THE INVENTION

The present invention relates to a cellular mobile communication system such as vehicle/hand-held telephone systems, cordless telephone systems (PCS), and the like and, more particularly, to a system having a roaming function.

In recent years, along with growing demand for mobile communications and evolution of communication techniques, many cellular mobile communication systems have been built and the areas covered by these systems are expanding rapidly. When a user wants to use a cellular mobile communication system, he or she purchases a terminal device of the desired system, and signs a contract for services provided by the carrier of that system. Under the contract, the user can receive communication services such as mobile voice communications, mobile data communications, and the like using his or her own terminal device everywhere in the service area covered by the system.

Recently, many carriers provide public mobile communication services such as vehicle/hand-held telephone services, a PCS (Personal Communication System), and the like. In addition to these public systems, in establishments such as factories and the like, schools, hotels, office buildings, and the like, private mobile communication systems such as a private PCS or the like are being built to provide their own mobile communication services. Under such circumstances, some users want to use not only the systems to which they belong but also other systems.

In order to meet such demand, in a recently proposed system, the system identification numbers of the individual systems to be used are registered in advance in a terminal device, so that a single terminal device can be used in a plurality of desired systems. With this system, when a user who has a terminal device of a certain public PCS visits the establishment or office building of an allied company or customer, he or she can talk on extension and subscriber lines using the private PCS built in such establishment or office building, resulting in much convenience.

However, in such conventional system, the user must register the system identification numbers of the systems he or she wants to use. For this reason, in an establishment or office the user visits for the first time other than those of allied companies or customers, the user cannot use his or her own terminal device even if he or she need to communicate. In this case, the user must locate a public telephone, resulting in much inconvenience.

BRIEF SUMMARY OF THE INVENTION

It is the first object of the present invention to provide a mobile communication system which allows a user to perform temporary use registration as needed even in a system in which the user has not registered yet and to receive services, thereby improving the convenience of the terminal user.

In order to achieve the above object, in a mobile communication system of the present invention, when a terminal device which is not registered for services provided by the system wants to use the system, the terminal device sends a temporary use registration request to a radio control apparatus. Upon reception of the temporary use registration request from the terminal device, the radio control apparatus sets terminal identification information to be used by the request source terminal device in the system, and supplies use permission information including the terminal identification information to the terminal device. At the same time, the radio control apparatus stores the set terminal identification information in correspondence with the terminal identification information of a system to which the terminal device originally belongs, and performs incoming/outgoing call control associated with the terminal device on the basis of the stored information. On the other hand, upon reception of the use permission information from the radio control apparatus, the terminal device stores the terminal identification information included in the use permission information together with the system identification number of that system, and performs incoming/outgoing call control of its own terminal device in the system.

Therefore, according to the present invention, a terminal device temporarily performs use registration to receive services even in a system in which use registration is not performed in advance. For example, even in an establishment or office the user visits for the first time other than those of allied companies or customers, when the user need to communicate, he or she temporarily makes use registration, and can talk on extension or subscriber lines using his or her terminal device as if that system were a home system. For this reason, the user of the terminal device need not ask for use of an extension terminal or locate a public telephone or the like to communicate, and the convenience of the terminal user can be remarkably improved.

The mobile communication system according to the present invention is also characterized in that the radio control apparatus broadcasts message information indicating whether or not transmission of a temporary use registration request from an unregistered terminal device is permitted, and a terminal device receives the message information to check based on the message information if its own use registration is permitted, and sends the temporary use registration request to the radio control apparatus only when the use registration is permitted.

With this arrangement, the terminal device transmits a temporary use registration request to only a system in which use registration is allowed, and consequently, inefficient use of radio channels can be reduced, thus lowering the control traffic of the system.

Furthermore, the mobile communication system according to the present invention is characterized in that when the radio control apparatus receives a temporary use registration request from a terminal device, the radio control apparatus verifies if the request source terminal device satisfies a condition upon using the system, and supplies use permission information to the request source terminal device only when it is determined that the use condition is satisfied.

With this arrangement, adverse influences on system equipment or troubles upon charging owing to the use of a terminal device, that does not meet the particular system requirements, in a system can be prevented.

Moreover, the mobile communication system according to the present invention is characterized in that the radio control apparatus checks based on the operation state of the own system if a temporary use registration request from a terminal device is allowed, and receives the temporary use registration request from the terminal device only when it is determined that the request is allowed.

As a method of checking if the temporary use registration request is allowed, a method based on the traffic of the own system, a method based on pre-stored time blocking information which indicates whether or not use registration is allowed in correspondence with a plurality of time zones, a method based on pre-stored area blocking information which indicates whether or not use registration is allowed in correspondence with a plurality of areas obtained by dividing the service area of the system, a method of checking if the temporary use registration request is allowed by selectively combining the above-mentioned methods, and the like may be used.

If use registration is authorized based on the traffic, when the system traffic is high, new use registration of external users is blocked and the already registered terminal devices of employees can be preferentially used.

When use registration is authorized in correspondence with time zones, new use registration can be blocked during the time zone in daytime with a high traffic, and use registration can be allowed in other time zones.

When use registration is authorized in units of areas, new use registration can be allowed in only a lounge or reception room where visitors are allowed access, and can be denied in other areas. In this manner, registration can be blocked depending on places.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows the format of a control channel signal sent from the exchange apparatus to the terminal device;

FIG. 6 is a flow chart showing the use registration request transmission control sequence and control contents in the terminal device;

FIG. 12 shows an example of a terminal information storage table used in the exchange apparatus;

FIG. 13 shows an example of a traffic information storage table used in the exchange apparatus;

FIG. 14 shows an example of a traffic capacity storage table used in the exchange apparatus;

FIG. 17 shows an example of a service time blocking table according to another embodiment of the present invention;

FIG. 18 shows an example of a service area call origination/termination blocking information table according to still another embodiment of the present invention.

DETAILED DESCRIPTION OF THE INVENTION

Figure 1:
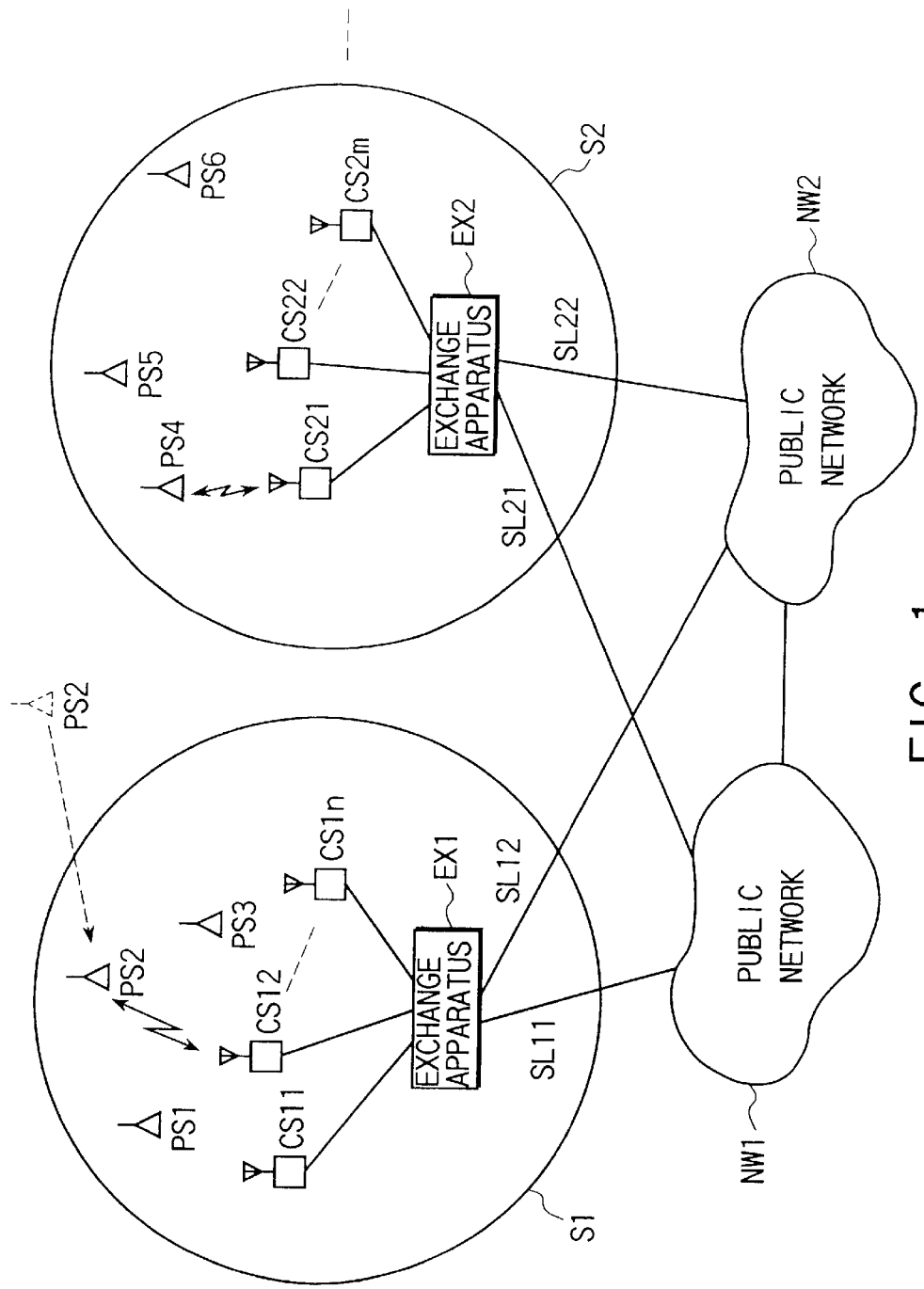
FIG. 1 is a schematic diagram showing an embodiment of a mobile communication system according to the present invention.

FIG. 1 is a schematic diagram showing an embodiment of a mobile communication system according to the present invention. Referring to FIG. 1, reference numerals S1 and S2 denote private mobile communication systems. These systems S1 and S2 are constructed by PCSs built in, e.g., establishments or office buildings of companies.

These primary PCS systems S1 and S2 comprise a plurality of base stations or cell sites CS11 to CS1$n$ and CS21 to CS2$m$ which are distributed in service areas, and exchange apparatuses EX1 and EX2 serving as radio control apparatuses that accommodate these base stations CS11 to CS1$n$ and CS21 to CS2$m$ via cable channels. As the exchange apparatuses EX1 and EX2, a private branch exchange (PBX), a key telephone main system, a concentration type base station apparatus, or the like may be used.

Each of the base stations CS11 to CS1$n$ and CS21 to CS2$m$ forms a radio area called a cell solely or together with another neighboring base station. The base stations connect terminal devices PS1 to PS6 present in such radio areas via radio channels. As a radio access system, for example, a TDMA-TDD (Time Division Multiple Access-Time Division Duplex) scheme is used.

The exchange apparatuses EX1 and EX2 are connected to a plurality of public networks NW1 and NW2 of different carriers via subscriber's lines SL11, SL12, SL21, and SL22. These public networks NW1 and NW2 include, e.g., a public PCS network, a cable subscriber network including it, a vehicle/hand-held telephone network directly or indirectly connected to such networks, and the like.

Figure 2:
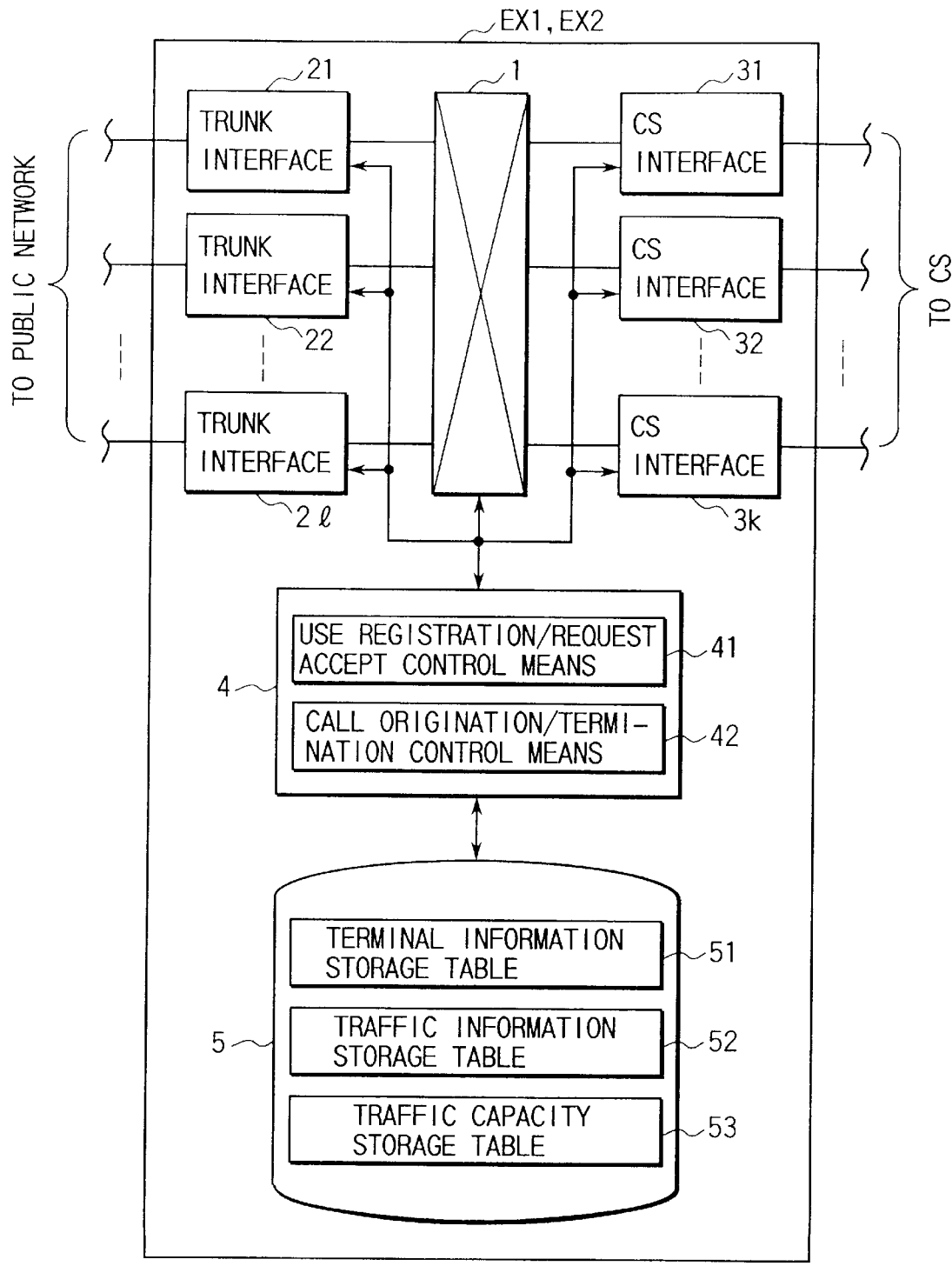
FIG. 2 is a block diagram showing the functional arrangement of an exchange apparatus of the system shown in FIG. 1.

FIG. 2 is a block diagram showing the functional arrangement of the exchange apparatuses EX1 and EX2. Each of the exchange apparatuses EX1 and EX2 comprises an exchange circuit 1 comprising a time switch, a plurality of trunk interfaces 21 to 2$l$, a plurality of base station interfaces 31 to 3$k$, a central control circuit (CC) 4, and a storage circuit 5.

Of these circuits, the trunk interfaces 21 to 2$l$ are connected to the public networks NW1 and NW2 via subscriber lines, and execute interface processing for subscriber lines such as detection of subscriber line incoming call, seizing/disconnection of subscriber lines, and the like. The base station interfaces 31 to 3$k$ are respectively connected to the base stations CS11 to CS1$n$ or the base stations CS21 to CS2m via extensions, and execute interface processing such as transmission of incoming call signals to these base stations, detection of outgoing call signals from these base stations, exchange of control information among the terminal devices PS1 to PS6, and the like.

The central control circuit 4 comprises a use registration request accept control means 41 for accepting a use registration request from a terminal device which is not registered for services provided by the system, and an incoming/outgoing call control means 42 for performing incoming/outgoing call control associated with a terminal device accommodated in the system by the use registration request accept control means 41, in addition to various normal control functions associated with the exchange processing among base stations and between the base stations and public networks.

The storage circuit 5 comprises a terminal information storage table 51, a traffic information storage table 52, and a traffic capacity storage table 53. The terminal information storage table 51 stores information representing the states of the plurality of terminal devices PS1 to PS6 accommodated in the system in correspondence with terminal identification numbers. The stored information includes position information of a terminal device, service class, information indicating if a terminal identification number is in use, and a terminal identification number of a terminal device in its home system, as shown in FIG. 12.

The traffic information storage table 52 stores traffics that change time-serially in the system in units of radio areas and service classes. FIG. 13 shows an example of this table. The traffic capacity storage table 53 stores traffic capacities in units of radio areas, base stations, and service classes. The capacities are set while being divided into two ranges, i.e., level 1 and level 2. FIG. 14 shows an example of this table.

Figure 3:
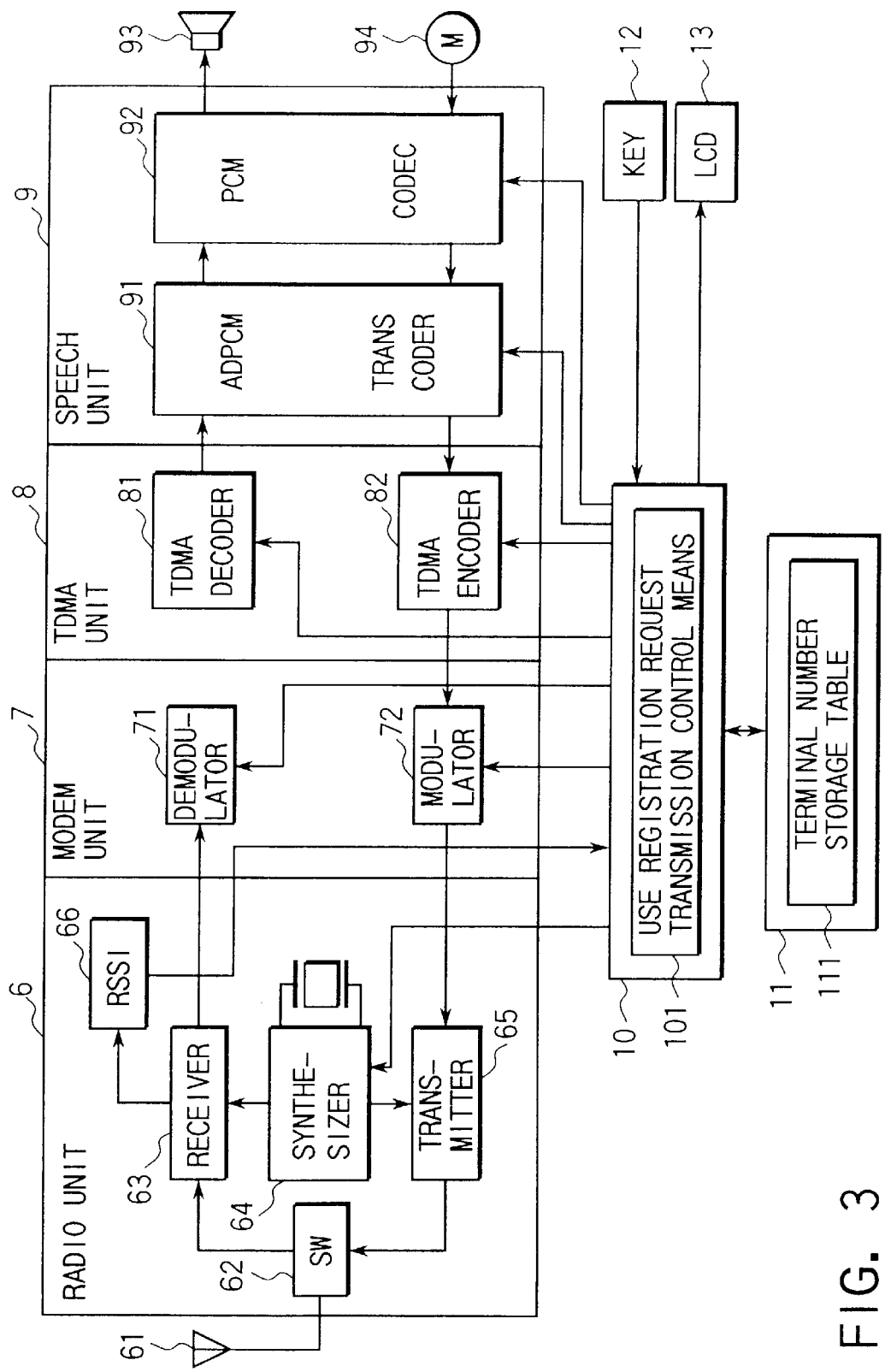
FIG. 3 is a block diagram showing the arrangement of a terminal device of the system shown in FIG. 1.

The arrangement of the terminal devices PS1 to PS6 will be explained below. FIG. 3 is a block diagram showing the arrangement of the terminal device.

Each of the terminal devices PS1 to PS6 comprises a radio unit 6 with an antenna 61, a modem unit 7, a TDMA unit 8, a speech unit 9, a storage unit 11, and a control unit 10 with a key input unit (KEY) 12 and a liquid crystal display unit (LCD) 13.

More specifically, a radio frequency signal coming from the base station CS is received by the antenna 61, and is then input to a receiver 63 via an RF switch 62 of the radio unit 6. The receiver 63 mixes the received radio frequency signal with a reception local oscillation signal generated by a frequency synthesizer 64 to frequency-convert it into a reception IF signal. Note that the local oscillation frequency generated by the frequency synthesizer 64 is instructed by the control unit 10 in accordance with the radio channel frequency. Also, the radio unit 6 comprises a reception electric field strength detector 66. The reception electric field strength detector 66 detects the reception electric field strength of the radio frequency signal coming from the base station CS, and supplies the detection value to the control unit 10.

The reception IF signal output from the receiver 63 is input to a demodulator 71 in the modem unit 7. The demodulator 71 digitally demodulates the reception IF signal, thus reconstructing a digital speech signal.

A TDMA decoder 81 in the TDMA unit 8 extracts the digital speech signal from a time slot assigned to the own terminal device in accordance with an instruction from the control unit 10, and supplies the extracted digital speech signal to the speech unit 9. The speech unit 9 comprises an adaptive differential PCM transcoder 91 and a PCM codec 92. The digital speech signal is sequentially decoded by the adaptive differential PCM transcoder 91 and the PCM codec 92 to reconstruct an analog speech signal. The analog speech signal is amplified by a receive amplifier (not shown), and is output via a loudspeaker 93.

On the other hand, a transmitting speech input to a microphone 94 is sequentially encoded by the PCM codec 92 and the adaptive differential PCM transcoder 91 to be converted into a digital speech signal. A TDMA encoder 82 inserts the digital speech signal output from the adaptive differential transcoder 91 in a time slot designated by the control unit 10, and supplies it to a modulator 72. The modulator 72 digitally modulates a carrier wave signal based on the digital speech signal, and inputs the modulated carrier wave signal to a transmitter 65. The transmitter 65 mixes the modulated carrier wave signal with a transmission local oscillation signal generated by the frequency synthesizer 64 to frequency-convert it into a radio channel frequency designated by the control unit 10. The frequency-converted carrier wave signal is amplified to a predetermined transmission power level by a transmission amplifier in the transmitter 65. The radio frequency signal output from the transmitter 65 is transmitted from the antenna 61 to the base station CS via the RF switch 62.

The control unit 10 comprises, e.g., a microcomputer as a main controller, and has as its control function a use registration request transmission control means 101 in addition to various normal control means associated with radio accesses and radio communications. The use registration request transmission control means 101 performs a series of control operations upon requesting use registration of a system in which the own device is not registered.

Figure 10:
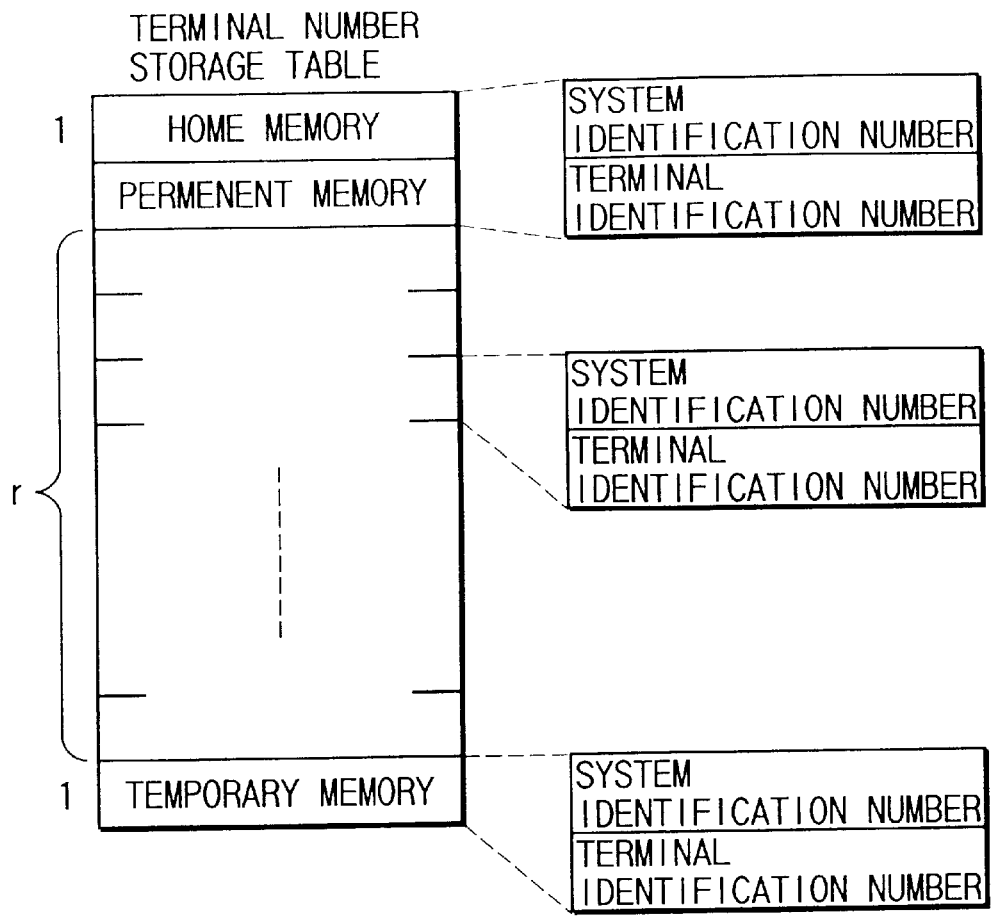
FIG. 10 shows an example of a terminal identification number storage table used in the terminal device.

The storage unit 11 is allocated with a terminal identification number storage table 111. The terminal identification number storage table 111 comprises a home memory, a permanent memory, and a temporary memory, as shown in, e.g., FIG. 10. The home memory permanently stores the system identification number and terminal identification number of the system the own device subscribes to. The permanent memory has a plurality of (r) memory areas. Each of these memory areas stores the system identification number of a system, the user of the own device wants to use, other than the home system, and the terminal identification number used in that system. When the user of the own device issues a use registration request to a system not registering this device, and the system grants permission of use, the temporary memory stores the system identification number of that system, and the terminal identification number used in that system.

The operation of the system with the above arrangement will be described below in accordance with the control procedure of the exchange apparatus and the terminal device. Note that a case will be exemplified below wherein the terminal device PS2 issues a use registration request to the system S1 not registering the terminal device PS2, as shown in FIG. 1.

The exchange apparatus EX1 of the system S1 detects the traffics of the system in units of radio areas and in units of terminal device groups corresponding to service classes, and stores the detection results in the traffic information storage table 52. More specifically, the exchange apparatus EX1 always monitors the traffics of the system in units of radio areas and in units of service classes to acquire the statistics of the traffics, and the latest traffic value is always stored in the traffic information storage table 52.

Figure 9:
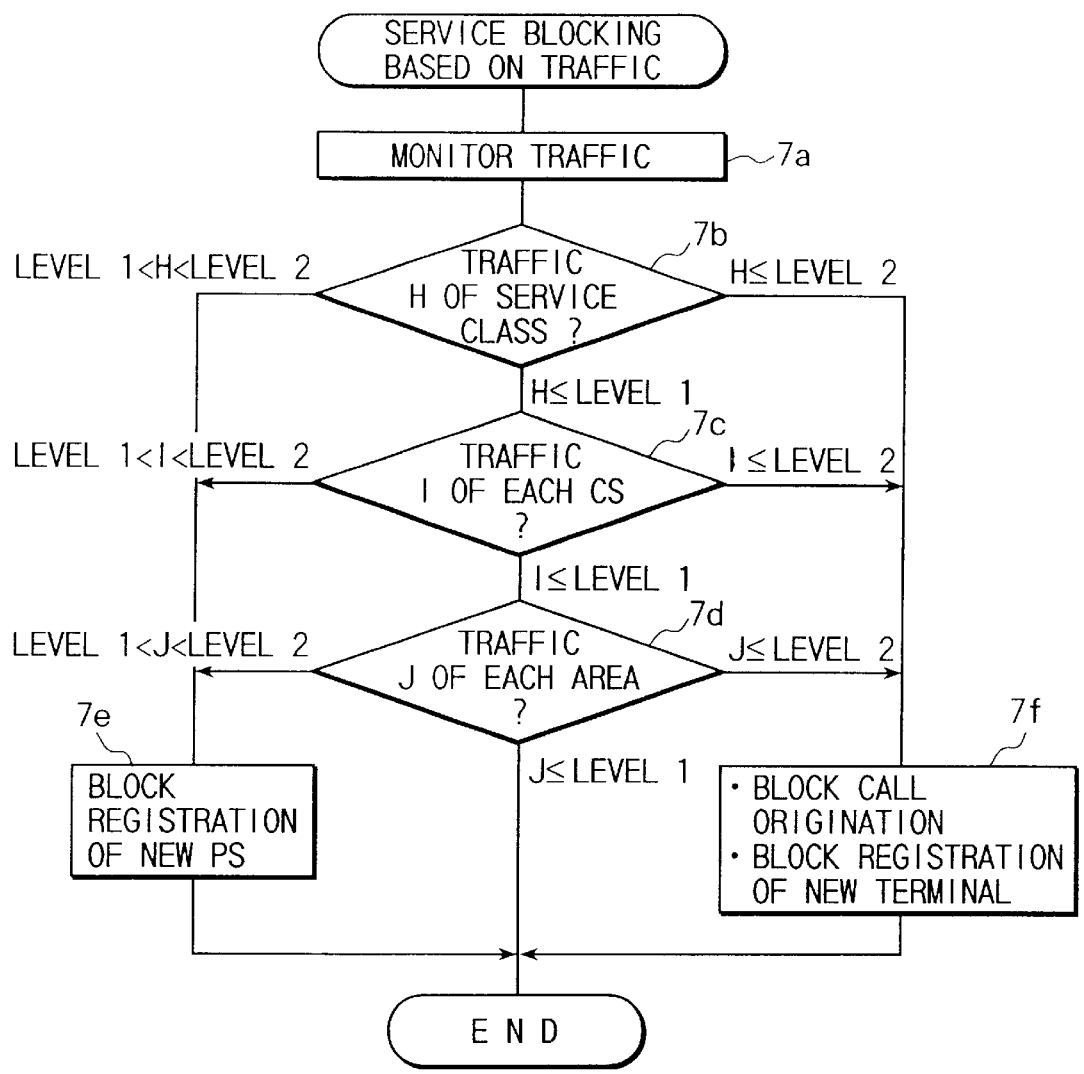
FIG. 9 is a flow chart showing the contents of service blocking processing based on the traffic in the exchange apparatus.

The exchange apparatus EX1 executes use registration request blocking processing with respect to unregistered terminal devices and outgoing call blocking processing for registered terminal devices on the basis of the traffic information stored in the traffic information storage table 52 and the traffic capacities stored in the traffic capacity storage table 53. FIG. 9 is a flow chart showing the processing contents.

That is, in step 7a, the exchange apparatus EX1 detects the latest traffics and stores the detection results in the traffic information storage table 52. In step 7b, the exchange apparatus EX1 compares the latest traffic H of each service class with the capacity of the corresponding service class, and if the traffic H is equal to or lower than level 1, the flow advances to step 7c. In step 7c, the exchange apparatus EX1 compares the latest traffic I of each base station with the capacity of the corresponding base station. If the traffic I is equal to or lower than level 1, the flow advances to step 7d. In step 7d, the exchange apparatus EX1 compares the latest traffic J of each radio area with the capacity of the corresponding radio area. If the traffic J is equal to or lower than level 1, the exchange apparatus EX1 determines that neither outgoing call blocking for registered terminal devices nor use registration request blocking for unregistered terminal devices are made.

More specifically, if it is determined in steps 7b, 7c, and 7d that the traffics H, I, and J are smaller than level 1 as the capacities, the exchange apparatus EX1 determines that the offered traffic is low, and supplies a message indicating the grant of use registration to unregistered terminal devices. This message is supplied using message information. FIG. 4 shows the format of the message information, and a system identification number is assigned a service grant/denial bit. When a message indicating the grant of use registration is to be supplied to the terminal devices, the service grant/denial bit is set at "0".

On the other hand, if it is determined in steps 7b, 7c, and 7d that at least one of the traffics H, I, and J is larger than level 1 of the capacity, the exchange apparatus EX1 determines that the traffic is high, and the flow advances to step 7e. In step 7e, the exchange apparatus EX1 informs unregistered terminal devices of blocking of use registration requests. In this case, message information in which the service grant/denial bit in the system identification number shown in FIG. 4 is set at "1" is transmitted to terminal devices present in the corresponding radio area or base station area.

Also, if it is determined in steps 7b, 7c, and 7d that at least one of the traffics H, I, and J is larger than level 2 of the capacity, the exchange apparatus EX1 determines that the traffic is very high, and the flow advances to step 7f. In step 7f, the exchange apparatus EX1 supplies a blocking message of use registration requests to unregistered terminal devices present in the corresponding radio area or base station area. At the same time, the exchange apparatus EX1 blocks outgoing call from the registered terminal devices present in the corresponding radio area or base station area. In this case as well, message information in which the service grant/denial bit in the system identification number is set at "1" is transmitted to terminal devices present in the corresponding radio area or base station area.

Figure 5:
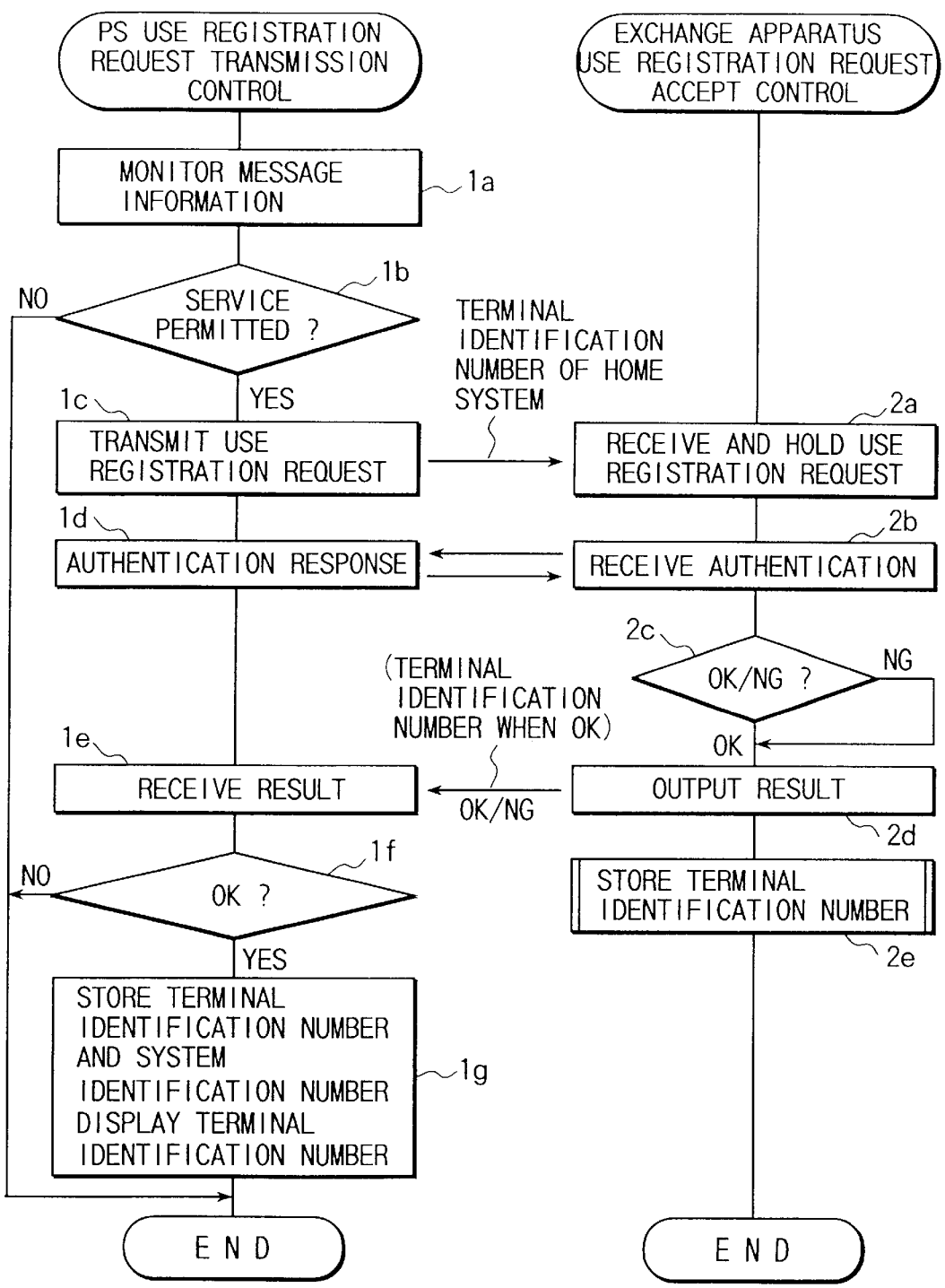
FIG. 5 is a flow chart showing the outline of the sequence of use registration request transmission control and use registration request accept control in the terminal device and exchange apparatus.

Assume that the terminal device PS2 transmits a use registration request to the exchange apparatus EX1 to make a call in the system S1. At this time, the terminal device PS2 receives the message information transmitted from the exchange apparatus EX1 in step 1a, as shown in FIG. 5, prior to transmission of the use registration request. The terminal device PS2 checks in step 1b based on the service grant/denial bit included in its system identification number if the use registration request is permitted.

If it is determined that the use registration request is permitted, the flow advances to step 1c, and the terminal device PS2 executes transmission control of the use registration request. FIG. 6 is a flow chart showing the control procedure and control contents.

In FIG. 6, the terminal device PS2 acquires a system identification number from a control channel signal sent from the exchange apparatus EX1 in step 3a. The terminal device PS2 then checks in step 3b based on the acquired system identification number and the system identification number stored in the home memory of the terminal identification number storage table 111 of the own device if the system in which the own device is present is the home system. If NO in step 3b, the flow advances to step 3c, and the terminal device PS2 searches in turn the permanent memory in the terminal identification number storage table 111 so as to check in step 3d if the system identification number acquired from the control channel signal has already been registered in the permanent memory. If the acquired system identification number is registered in none of permanent memory areas, the flow advances from step 3e to step 3f to search the temporary memory in turn. If the acquired system identification number is not registered in the temporary memory, either, the terminal device PS2 transmits a use registration request to the exchange apparatus EX1. Note that the terminal identification number in the home system is inserted in the use registration request.

More specifically, only when the terminal device PS2 receives a permission message regarding a use registration request for an unregistered terminal device from the exchange apparatus EX1, and the corresponding system identification number is registered in none of memories in its own terminal identification number storage table 111, it transmits a use registration request. For this reason, the terminal device transmits a use registration request to only a system that does not register the terminal device and can accept use registration. Hence, inefficient use of control channels can be suppressed, and an increase in control traffic of the system can be suppressed.

On the other hand, when the terminal device PS2 transmits the use registration request, the exchange apparatus EX1 receives and holds this use registration request in step 2a in FIG. 5. Thereafter, the flow advances to step 2b, and the exchange apparatus EX1 executes authentication processing of the terminal device PS2 with the request source terminal device PS2.

Figure 7:
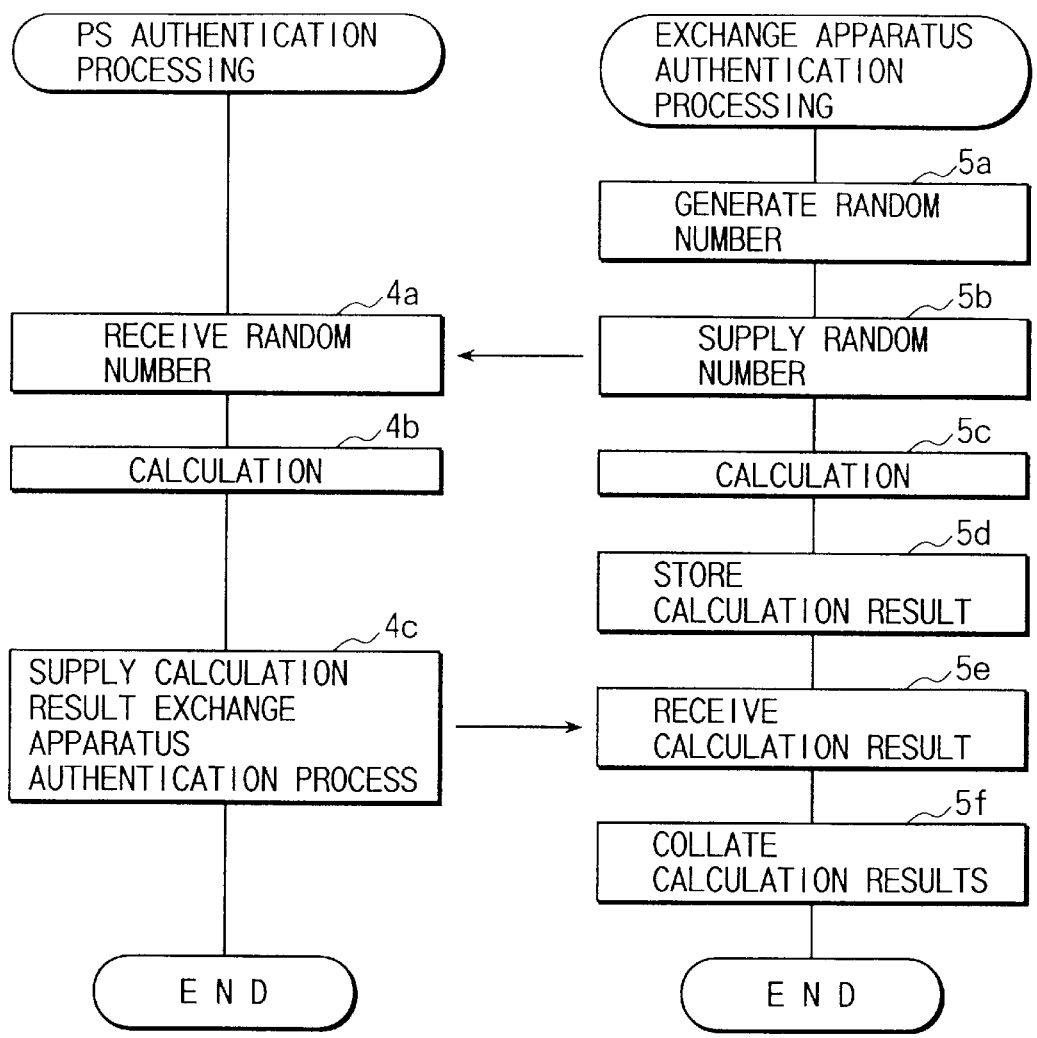
FIG. 7 is a flow chart showing the authentication processing in the exchange apparatus and terminal device.

That is, the exchange apparatus EX1 generates a random number for authentication in step 5a, and supplies the random number to the terminal device PS2 in step 5b, as shown in FIG. 7. The exchange apparatus EX1 performs a predetermined calculation based on this random number in step 5c, and stores the calculation result in a memory in step 5d.

Meanwhile, the request source terminal device PS2 receives the random number supplied from the exchange apparatus EX1 in step 4a, and performs the same calculation as that in the exchange apparatus EX1 based on the random number in step 4b. A calculation formula for this purpose is pre-stored. When the calculation result is obtained, the terminal device PS2 sends it to the exchange apparatus EX1 in step 4c.

Upon reception of the calculation result, the flow advances from step 5e to step 5f, and the exchange apparatus EX1 collates the received calculation result and that calculated by itself. If the two results coincide with each other, the exchange apparatus EX1 determines that the request source terminal device PS2 qualifies to register in the own system, and the flow advances from step 2c to step 2d. In step 2d, the exchange apparatus EX1 generates a terminal identification number to be used by the request source terminal device PS2 in the own system, and supplies a use permission message including the generated terminal identification number to the request source terminal device PS2. In contrast to this, when the request source terminal device PS2 does not satisfy requirements of the own system or has not signed a roaming agreement, the calculation results for authentication do not coincide with each other. For this reason, the exchange apparatus EX1 supplies a use denial message to the request source terminal device PS2.

Figure 11:
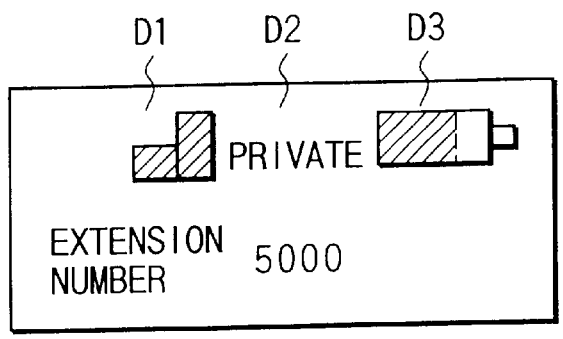
FIG. 11 shows a display example of an LCD display in the terminal device.

Upon completion of the authentication processing in step 1d, when the request source terminal device PS2 receives a use permission message from the exchange apparatus EX1 in step 1e, the flow advances from step 1f to step 1g. In step 1g, the terminal device PS2 stores the terminal identification number included in the use permission message in its own temporary memory together with the system identification number of the system S1. At this time, the terminal identification number is displayed on the LCD display 13. FIG. 11 shows a display example. In FIG. 11, D1 is information indicating the reception electric field strength, D2 is information indicating the type of system, and D3 is information indicating the remaining capacity of a battery.

On the other hand, when the terminal device PS2 receives a use denial message from the exchange apparatus EX1, the message is displayed on the LCD display 13. For this reason, the user can easily recognize based on the displayed information whether or not his or her own terminal device is registered in the system.

Note that the user may be informed of the use permission or denial by turning on or flickering of a lamp, a sound, or a vibration in place of a display on the LCD display 13.

Upon reception of the use permission message, a guidance message indicating the grant of use may be displayed on the LCD display 13. On the other hand, upon reception of the use permission message, a guidance message indicating denial of use may be displayed on the LCD display 13. In this case, the base station may insert the reason for use denial in the use denial message, and the terminal device may display this reason for use denial. With this message, the user of the terminal device can clearly recognize the reason for use denial, i.e., if his or her device cannot satisfy the system requirement or has not signed a roaming agreement.

Figure 8:
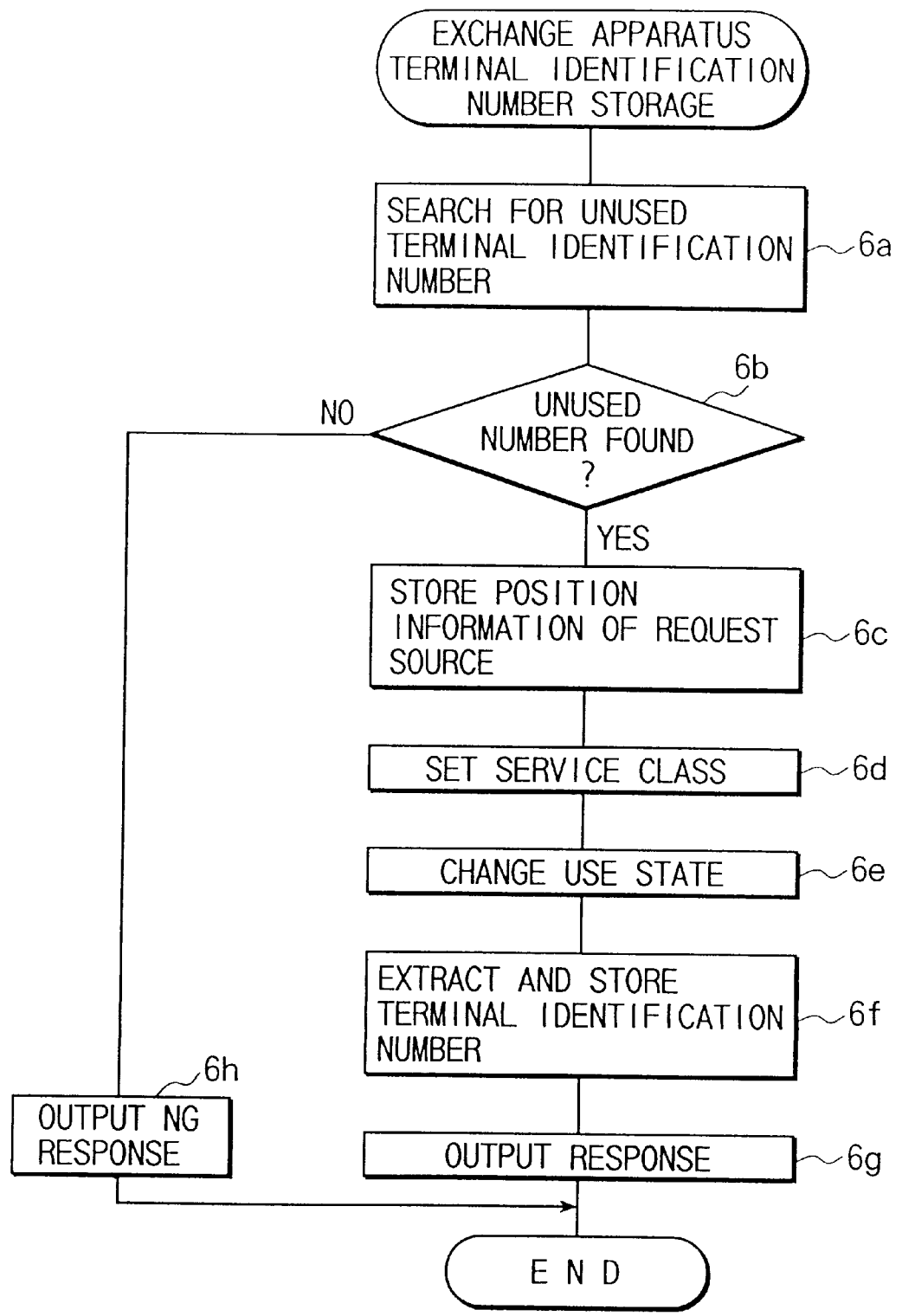
FIG. 8 is a flow chart showing the contents of terminal identification number storage processing in the exchange apparatus.

After the exchange apparatus EX1 sends the use permission message, the flow advances to step 2e to perform storage processing of the terminal identification number. FIG. 8 is a flow chart the contents of that processing.

More specifically, the exchange apparatus EX1 searches the terminal information storage table 51 (shown in FIG. 12) in step 6a, and checks in step 6b if an unused terminal identification number is available. If an unused terminal identification number is detected, the exchange apparatus EX1 stores the position information of the request source terminal device PS2 in correspondence with the detected terminal identification number in step 6c. Also, the exchange apparatus EX1 sets and stores a service class in step 6d, and rewrites the use state from "unused" to "in use" in step 6e. Furthermore, the exchange apparatus EX1 stores the terminal identification number of the home system sent from the request source terminal device PS2 in step 6f. Upon completion of storage of required information, the exchange apparatus EX1 sends a response to the request source terminal device PS2 in step 6g. If no unused terminal identification number is found, the exchange apparatus EX1 sends an NG response in step 6h.

In this manner, a series of control operations associated with the use registration request are completed. The terminal device PS2 is registered in the system S1, and can receive communication services provided by this system.

The outgoing/incoming call operation of the terminal device PS2 which is use-registered in another system will be described below.

Figure 15:
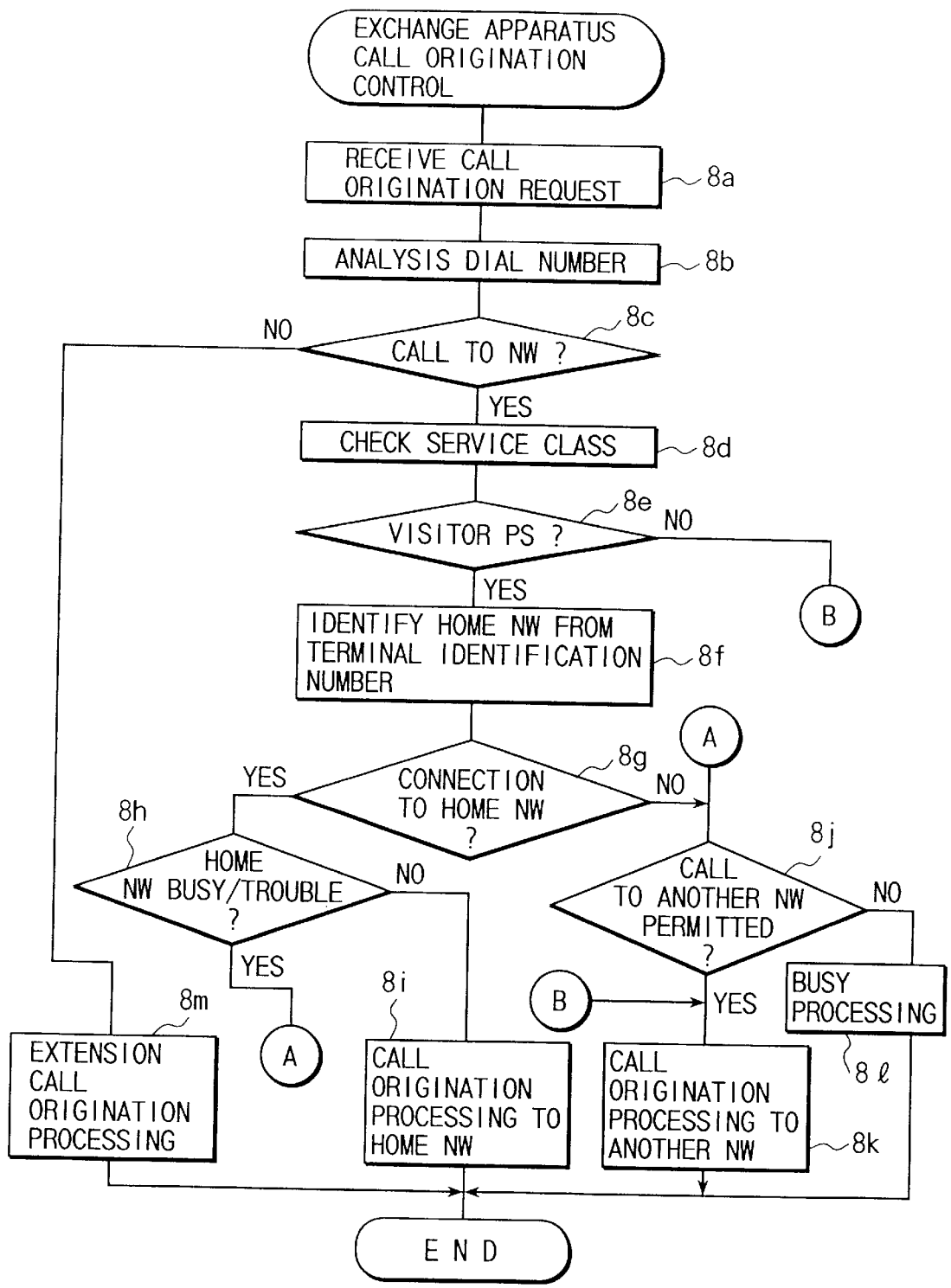
FIG. 15 is a flow chart showing the call origination control sequence and its contents in the exchange apparatus.

The operation executed when the terminal device PS2 places a call will be described below. Prior to placing a call, the terminal device PS2 sends a call origination request to the exchange apparatus EX1. The outgoing call request is transferred to the exchange apparatus EX1 via the nearest base station CS12. The exchange apparatus EX1 receives the outgoing call request in step 8a, as shown in FIG. 15, and analyzes the dial number of the destination in step 8b. As a result of analysis, if the destination is another terminal device in the system, the flow advances to step 8m to execute extension outgoing call processing.

On the contrary, if the destination is an outgoing call to subscriber line, i.e., the public network NW1 or NW2, the flow advances from step 8c to step 8d to check the service class. Also, the exchange apparatus EX1 checks in step 8e if the source is a visitor terminal device that has moved from another system. For example, if the source is a visitor terminal like the above-mentioned terminal device PS2, the exchange apparatus EX1 searches the terminal information storage table 51 in step 8f to read out the terminal identification number of the source terminal device PS2, and determines a public network corresponding to the home network of the terminal device PS2 on the basis of the readout terminal identification number. The exchange apparatus EX1 checks in step 8g if the own system can be connected to that home network. If YES in step 8g, the flow advances to step 8h to check if the home network is busy or corrupted. If NO in step 8h, the exchange apparatus EX1 performs outgoing call processing to that home network in step 8i.

On the contrary, when it is impossible to connect the home network, e.g., when the own system is not connected to the home network, the flow advances to step 8j to check if outgoing call to another public network is permitted. If YES in step 8j, the exchange apparatus EX1 performs outgoing call processing to the other public network. On the other hand, if NO in step 8j, the exchange apparatus EX1 performs busy processing in step 8e.

Accordingly, when the terminal device PS2 places a call in the system in which it is registered for temporary use, the home network of the terminal device PS2 is preferentially selected to execute outgoing call processing. For this reason, even when the terminal device PS2 places a call from the system in which it is registered for temporary use, the terminal device PS2 can perform outgoing call via the home network, thus simplifying charging processing. In steps 8g and 8j, by selecting a network with the lowest communication fee, an outgoing call can be made via the network with the lowest fee.

Figure 16:
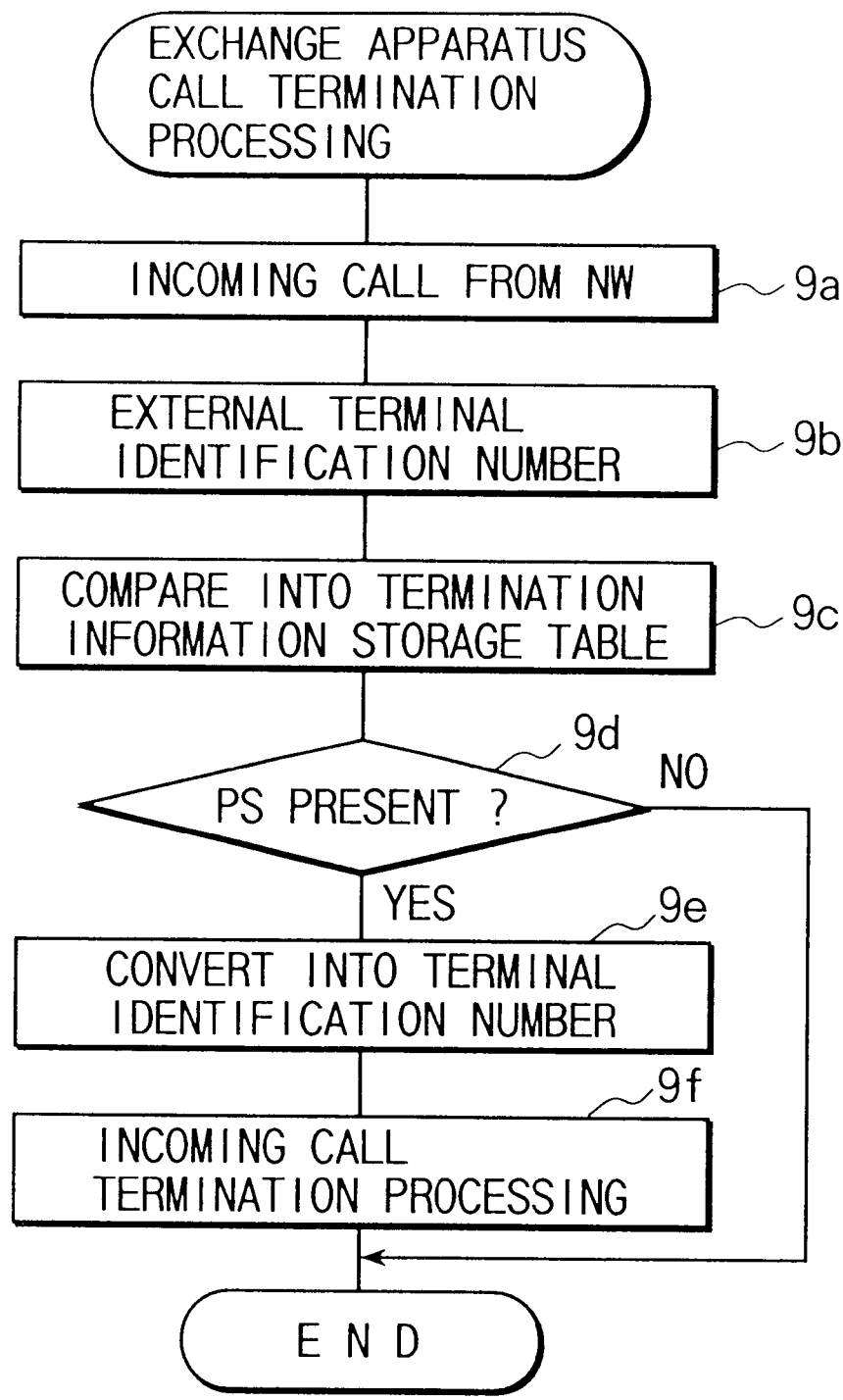
FIG. 16 is a flow chart showing the call termination control sequence and its contents in the exchange apparatus.

On the other hand, when a call destined to the terminal device PS2 arrives from the public network NW1 or NW2, the exchange apparatus EX1 operates as follows. More specifically, when an incoming call signal destined to the terminal device PS2 comes from the public network NW1 or NW2, the exchange apparatus EX1 receives the incoming call signal in step 9a, as shown in FIG. 16, and extracts the terminal identification number of the destination from the incoming call signal in step 9b. Subsequently, the exchange apparatus EX1 searches the terminal information storage table 51 in step 9c, and checks in step 9d if the corresponding terminal device is registered. If it is determined that the corresponding terminal device PS2 is registered, the flow advances to step 9e, and the exchange apparatus EX2 converts the terminal identification number into that of the own system and executes call termination processing for the terminal device PS2 using the converted terminal identification number in step 9f.

In this manner, the terminal device PS2 is called, and if the terminal device PS2 goes off-hook to answer the phone, the terminal device PS2 can perform voice communications with the calling party.

When the terminal device PS2 leaves the service area of the system in which it is registered for temporary use, communications associated with the position registration procedure which should be periodically performed between the terminal device PS2 and the exchange apparatus EX1 are interrupted. When the exchange apparatus EX1 detects that communications with the terminal device PS2 have been interrupted for a predetermined period of time, it determines that the terminal device PS2 has ended the use of the own system, and deletes the use registration information associated with the terminal device PS2 stored in the terminal information storage table 51. In this manner, temporary use registration of the visitor system is canceled. Note that temporary use registration may be automatically canceled when the time reaches 0:00 AM.

As described above, according to this embodiment, when communications are to be done using a system S1 that does not register the terminal device PS2, the terminal device PS2 sends a temporary use registration request to the exchange apparatus EX1 after it confirms the grant of use registration on the basis of the message information broadcasted from the exchange apparatus EX1. Upon reception of the use registration request, the exchange apparatus EX1 verifies the identity of the request source terminal device, and thereafter, supplies the terminal identification number of the own system to the terminal device. Also, the exchange apparatus EX1 stores that terminal identification number in correspondence with the home terminal identification number of the request source terminal device, and processes incoming/outgoing call associated with the terminal device PS2 on the basis of the stored information.

Accordingly, when the terminal device PS2 temporarily makes use registration even in the system S1 in which it is not originally registered as needed, it can receive services. For example, even in an establishment or office the user visits for the first time other than those of allied companies or customers, the user can talk on extension or subscriber lines using his or her terminal devices PS2 when a need for doing so arises. For this reason, the user need not ask for use of an extension terminal or locate a public telephone or the like, and the convenience of the terminal user can be remarkably improved.

Prior to transmission of the temporary use registration request, the terminal device PS2 checks based on the message information from the exchange apparatus EX1 if use registration is permitted. The terminal device PS2 transmits the use registration request only when registration is permitted. For this reason, the terminal device PS2 transmits a user registration request to only a system in which its use registration is allowed, and consequently, inefficient use of radio channels can be suppressed, thus lowering the traffic of the system.

Furthermore, upon reception of the use registration request, the exchange apparatus EX1 authenticates the request source terminal device PS2, and grants permission of registration only when the terminal device PS2 qualifies as a result of authentication. For this reason, a terminal device which does not satisfy the specific requirements of the system or has not signed a roaming agreement with the system is never used in the system and, hence, adverse influences on system equipment and troubles upon charging can be prevented.

In the terminal device of this embodiment, whether or not use registration is permitted is displayed on the LCD display 13 on the basis of the use permission or denial information sent from the exchange apparatus. For this reason, the user can visually confirm based on the information displayed on the LCD display 13 if his or her own terminal device is registered in the system.

Note that the present invention is not limited to the above embodiment. For example, in the above embodiment, system traffics are monitored in units of radio areas, and use registration is blocked in units of radio areas on the basis of the monitoring results. However, the present invention is not limited to such specific blocking mechanism, and a service time blocking information table shown in, e.g., FIG. 17 may be used to block use registration in units of time zones. Alternatively, as shown in, e.g., FIG. 18, whether or not use registration is permitted may be determined in units of areas, and use registration may be blocked in units of areas on the basis of such information.

Figure 19:
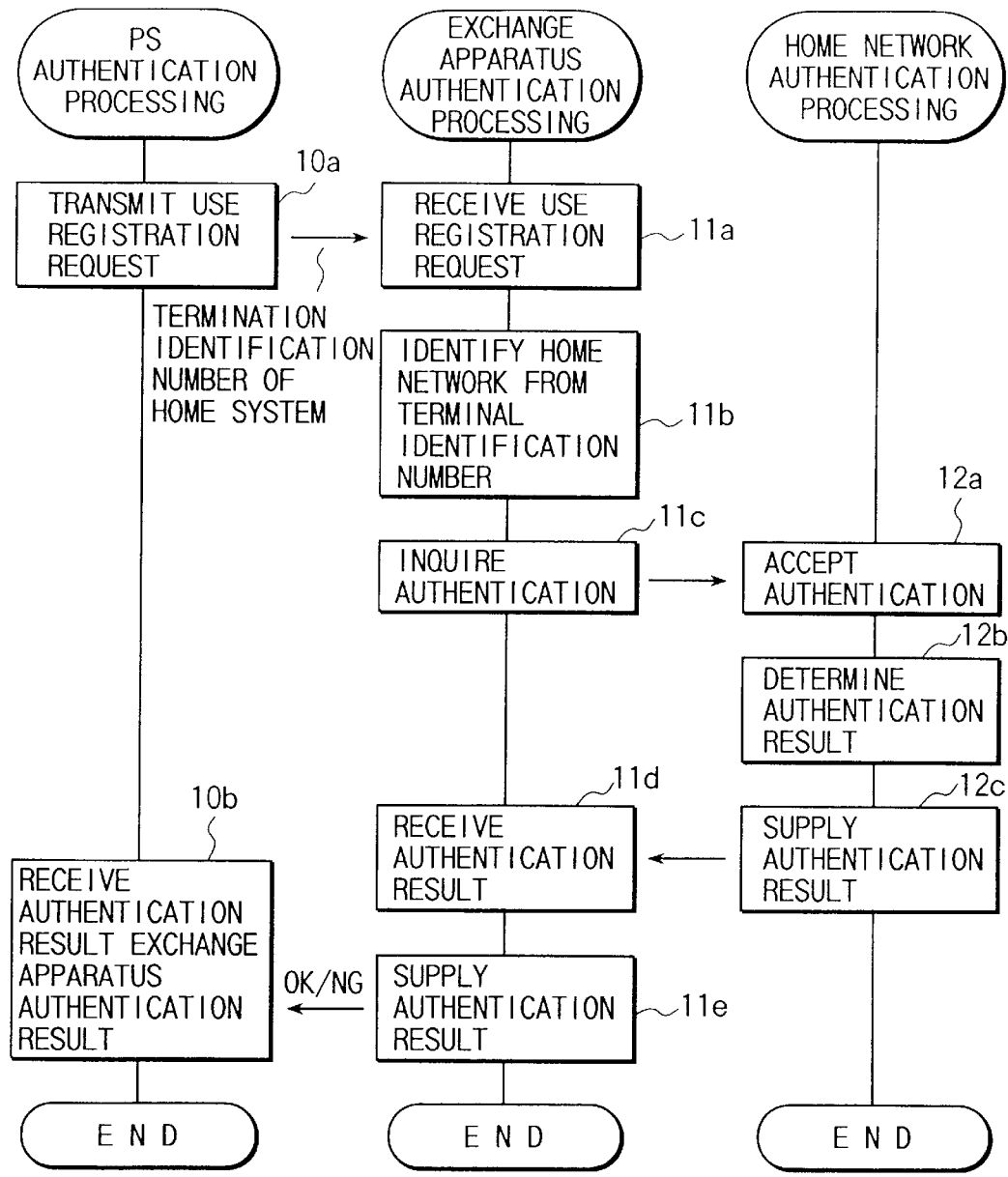
FIG. 19 is a flow chart showing the sequence of authentication processing and its processing contents according to still another embodiment of the present invention.

In the above embodiment, upon reception of the use registration request form the terminal device PS2, authentication processing associated with the terminal device PS2 is performed between the exchange apparatus EX1 and the request source terminal device PS2. However, the authentication processing need not always be required. Alternatively, the authentication processing may be performed by the home network to which the request source terminal device belongs, in place of the exchange apparatus EX1. FIG. 19 is a flow chart showing the authentication processing procedure and its processing contents in the terminal device, exchange apparatus, and home network in such case.

More specifically, assume that the terminal device PS2 sends a use registration request in step 10a. The exchange apparatus EX1 receives the use registration request in step 11a, and extracts the terminal identification number of the request source terminal device PS2 from the received use registration request. The exchange apparatus 11b identifies the home network to which the request source terminal device PS2 originally belongs on the basis of the extracted terminal identification number in step 11b, and transmits authentication inquiry information to the home network in step 11c.

Upon reception of the authentication inquiry information from the exchange apparatus EX1 in step 12a, the home network searches its own terminal information storage table on the basis of the authentication inquiry information in step 12b to verify if the inquiry source terminal device PS2 belongs to the own system. Then, the home system supplies the authentication result to the exchange apparatus EX1 in step 12c. Upon reception of the authentication result in step lid, the exchange apparatus EX1 generates a message indicating whether or not use registration is permitted on the basis of the authentication result, and transmits it to the request source terminal device PS2 in step 11e.

Upon reception of the message in step 10b, the request source terminal device PS2 checks in step 1f based on the received message in step 1f if use registration is permitted, as has been described previously with reference to FIG. 5. If use registration is permitted, the flow advances to step 1g. In step 1g, the terminal device PS2 stores the terminal identification number included in the use permission message in its own temporary memory together with the system identification number of the system S1. At this time, the terminal device PS2 displays the terminal identification number on the LCD display 13. On the other hand, when a use denial message is received from the exchange apparatus EX1, it is displayed on the LCD 13.

As described above, as the home network authenticates the terminal device PS2 that issued the use registration request, the exchange apparatus EX1 need not have any authentication function of terminal devices, and the processing load on the exchange apparatus can be reduced accordingly.

Furthermore, in the above embodiment, the use registration request procedure from the terminal device PS2 to the exchange apparatus EX1 is performed independently of other control procedures. However, the use registration request procedure may be included in the position registration procedure or outgoing call procedure of the terminal device PS2.

Moreover, in the above embodiment, the terminal device PS2 checks based on the message information coming from the exchange apparatus EX1 if a use registration request is permitted, and sends the use registration request only when the use registration is permitted. However, the terminal device PS2 may freely output a use registration request at any time, and the exchange apparatus EX1 that received the request may determine whether or not to accept the request in correspondence with the operation state at that time.

Also, in the above embodiment, the use permission or denial message sent from the exchange apparatus is displayed on the LCD display 13 to inform the user of it. Alternatively, the terminal device may inform the user of such message by outputting tones or a voice message from a sounder or handset.

Furthermore, the above embodiment has exemplified a case wherein the terminal device of the public PCS issues a use registration request to the system of the private PCS. However, the present invention is not limited to such specific situation. For example, the present invention can be applied to a case wherein a terminal device of the public PCS issues a use registration request to a public system of another carrier, a case wherein a terminal device of a public vehicle/hand-held telephone system issues a use registration request to a public vehicle/hand-held telephone system of another carrier, and a case wherein a terminal device of a private hand-held telephone system issues a use registration request to another private hand-held telephone system.

In addition, the arrangements of the terminal device and exchange apparatus, the use registration request transmission procedure, use registration request accept procedure, and their contents, the call origination/termination procedure after registration and its contents, and the like may be variously modified without departing from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A mobile communication system which comprises a plurality of base stations distributed in a service area, a terminal device connected to one of said base stations via a radio channel, and a radio control apparatus which accommodates said plurality of base stations and systematically controls said system, wherein said radio control apparatus comprises:
monitoring means for monitoring whether or not a temporary use registration request that requests temporary use registration for said system is received from said terminal device;
setting means for, when said monitoring means detects that the temporary use registration request is received, setting first terminal identification information to be used by a request source terminal device in said system, said request source terminal device originally belonging to said at least one different mobile communications system;
request response means for supplying use permission information including the first terminal identification information set by said setting means to the request source terminal device;
first storage means for storing the first terminal identification information set by said setting means in correspondence with second terminal identification information used in the another system to which the request source terminal device originally belongs;
first control means for executing subsequent call origination/termination control associated with the request source terminal device on the basis of the information stored in said first storage means; and
means for continuously broadcasting, from the base station, message information indicating if a permission of the temporary use registration is to be supplied to the terminal device which is not registered in said system, and wherein said terminal device comprises:
request transmission means for transmitting the temporary use registration request to said radio control apparatus, said request transmission means receiving the message information and checking based on the message information if the temporary use registration request is permitted, and transmitting the temporary use registration request to said radio control apparatus only when it is determined that the temporary use registration request is permitted;
second storage means for, when the use permission information is supplied from said radio control apparatus in response to the transmitted temporary use registration request, storing the first terminal identification information included in the use permission information together with a system identification number of said system; and
second control means for executing subsequent call origination/termination control of an own terminal device in said system on the basis of the information stored in said second storage means, said own terminal device originally belonging to said system.

2. A system according to claim 1, wherein said radio control apparatus further comprises authentication means for verifying if the request source terminal device satisfies a condition for using the own system when the temporary use registration request is received from said terminal device, and supplying the use permission information to the request source terminal device only when the use condition is satisfied.

3. A system according to claim 1, wherein said radio control apparatus further comprises determination means for determining based on an operation state of the own system if the temporary use registration request from said terminal device is permitted, and said monitoring means accepts the temporary use registration request from said terminal device only when said determination means determines that the temporary use registration request from said terminal device is permitted.

4. A system according to claim 3, wherein said determination means monitors a traffic of the own system, and determines based on the traffic if the temporary use registration request from said terminal device is permitted.

5. A system according to claim 3, wherein when said plurality of base stations form a plurality of small areas that divide the service area, said determination means comprises means which pre-stores area blocking information indicating if the temporary use registration request from said terminal device is permitted in correspondence with each of the plurality of small areas, and determines based on the area blocking information stored in said means if the temporary use registration request from said terminal device is permitted.

6. A system according to claim 3, wherein when said plurality of base stations form a plurality of small areas that divide the service area, said determination means monitors traffics of the plurality of small areas, and determines based on the traffics in units of small areas if the temporary use registration request from said terminal device is permitted.

7. A system according to claim 3, wherein said determination means comprises means which pre-stores time blocking information indicating if the temporary use registration request from said terminal device is permitted in correspondence with each of a plurality of time zones, and determines based on the time blocking information stored in said means if the temporary use registration request from said terminal device is permitted.

8. A system according to claim 1, wherein said radio control apparatus further comprises use registration canceling means for checking if a use canceling condition of the terminal device from which the temporary use registration request has been accepted is satisfied, and deleting the stored information corresponding to the terminal device for which the use canceling condition has been satisfied from said first storage means.

9. A terminal device which is connected to a base station via a radio channel in a mobile communication system which comprises a plurality of base stations distributed in a service area, and a radio control apparatus which accommodates said plurality of base stations and systematically controls said system, comprising:

request transmission means for transmitting a temporary use registration request of said system to said radio control apparatus;

means for receiving predetermined message information continuously broadcast from said radio control apparatus, and reading system identification information and use permission information both included in the message information;

storage means for, when the message information including use permission information is supplied from said radio control apparatus in response to the transmitted temporary use registration request, storing terminal identification information included in the use permission information together with a system identification number of said system; and call origination/termination control means for executing call origination/termination control of the terminal device in said system on the basis of the information stored in said storage means.

10. A device according to claim 9, wherein said storage means comprises:

a first storage unit which stores a system identification number of a home system to which the terminal device belongs, and terminal identification information;

a second storage unit which stores a system identification number of at least one visitor system registered as a destination of movement, and terminal identification information; and a third storage unit for temporarily storing the terminal identification information included in the use permission information supplied from said radio control apparatus together with the system identification number of said system.

11. A device according to claim 9, further comprising:

means for checking if the read system identification number has already been stored in one of said first, second, and third storage units; and means for permitting transmission of the temporary use registration request to said radio control apparatus only when said checking means determines that the system identification number is stored in none of said first to third storage units yet.

12. A device according to claim 9, further comprising informing means for checking based on a presence/absence of a message of the use permission information from said radio control apparatus if the temporary use registration request from said terminal device is permitted in said system, and informing a user of the checking result.

13. A device according to claim 12, wherein said informing means displays at least one of contents of the user permission information and a message indicating a grant of use registration.

14. A device according to claim 12, wherein when the use registration request is denied, said informing means displays a message indicating the denial.

15. A radio control apparatus which accommodates a plurality of base stations and systematically controls a mobile communication system, which comprises the plurality of base stations and a terminal device connected to each of the base stations via a radio channel, and is connected to at least one different network system, comprising:

monitoring means for monitoring whether or not a temporary use registration request is received from said terminal device via the base station;

setting means for, when said monitoring means detects that the temporary use registration request is received, setting first terminal identification information to be used by the request source terminal device in said mobile communication system;

request response means for supplying use permission information including the first terminal identification information set by said setting means to the request source terminal device;

storage means for storing the first terminal identification information set by said setting means in correspondence with second terminal identification information used in another network system to which the request source terminal device originally belongs;

control means for executing subsequent call origination/termination control associated with the request source terminal device on the basis of the information stored in said storage means; and means for continuously broadcasting, from the base station, message information indicating if a permission of the temporary use registration is to be supplied to the terminal device which is not registered in said system, thereby the terminal device receiving the message information and checking based on the message information if the temporary use registration request is permitted, and transmitting the temporary use registration request to said radio control apparatus only when it is determined that the temporary use registration request is permitted.

16. An apparatus according to claim 15, further comprising authentication means for verifying if the request source terminal device satisfies a condition for using the system when the temporary use registration request is received from said terminal device, and supplying the use permission information to the request source terminal device only when the use condition is satisfied.

17. An apparatus according to claim 15, further comprising determination means for determining based on an operation state of the system if the temporary use registration request from said terminal device is permitted, and wherein said monitoring means accepts the temporary use registration request from said terminal device only when said determination means determines that the temporary use registration request from said terminal device is permitted.

18. An apparatus according to claim 15, wherein said control means comprises means for, when a call origination request to the other network system is received from said terminal device, identifying a home system to which said terminal device originally belongs on the basis of terminal identification information of the source terminal device included in the call origination request, and means for checking if a call can be originated to the home system, and originating a call to the other network system via the home system when it is determined that the call can be originated to the home system.

19. An apparatus according to claim 15, wherein when a call termination request is received from the other network system, said control means compares terminal identification information of a destination included in the call termination request with termination identification information of a home system, and converts the terminal identification information of the destination into the terminal identification information of the home system to perform call termination processing when the two pieces of information coincide with each other.

20. A radio control apparatus which accommodates a plurality of base stations and systematically controls a mobile communication system, which comprises the plurality of base stations and a terminal device connected to each of the base stations via a radio channel, and is connected to at least one different network system, comprising:

monitoring means for monitoring whether or not a temporary use registration request is received from said terminal device via the base station;

setting means for, when said monitoring means detects that the temporary use registration request is received, setting first terminal identification information to be used by the request source terminal device in said mobile communication system;

request response means for supplying use permission information including the first terminal identification information set by said setting means to the request source terminal device;

storage means for storing the first terminal identification information set by said setting means in correspondence with second terminal identification information used in another network system to which the request source terminal device originally belongs; and control means for executing subsequent call origination/termination control associated with the request source terminal device on the basis of the information stored in said storage means, wherein when a call termination request is received from the other network system, said control means compares terminal identification information of a destination included in the call termination request with termination identification information of a home system, and converts the terminal identification information of the destination into the terminal identification information of the home system to perform call termination processing when the two pieces of information coincide with each other.

21. An apparatus according to claim 20, further comprising authentication means for verifying if the request source terminal device satisfies a condition for using the system when the temporary use registration request is received from said terminal device, and supplying the use permission information to the request source terminal device only when the use condition is satisfied.

22. An apparatus according to claim 20, further comprising determination means for determining based on an operation state of the system if the temporary use registration request from said terminal device is permitted, and wherein said monitoring means accepts the temporary use registration request from said terminal device only when said determination means determines that the temporary use registration request from said terminal device is permitted.

23. An apparatus according to claim 20, wherein said control means comprises means for, when a call origination request to the other network system is received from said terminal device, identifying a home system to which said terminal device originally belongs on the basis of terminal identification information of the source terminal device included in the call origination request, and means for checking if a call can be originated to the home system, and originating a call to the other network system via the home system when it is determined that the call can be originated to the home system.

24. A mobile communication system which comprises a plurality of base stations distributed in a service area, a terminal device connected to one of said base stations via a radio channel, and a radio control apparatus which accommodates said plurality of base stations and systematically controls said system, and is connected to at least one different mobile communication system, wherein said radio control apparatus comprises:

monitoring means for monitoring whether or not a temporary use registration request that requests temporary use registration for said system is received from said terminal device;

setting means for, when said monitoring means detects that the temporary use registration request is received, setting first terminal identification information to be used by a request source terminal device in said system, said request source terminal device originally belonging to said at least one different mobile communication system;

request response means for supplying use permission information including the first terminal identification information set by said setting means to the request source terminal device;

first storage means for storing the first terminal identification information set by said setting means in correspondence with second terminal identification information used in said at least one different mobile communication system to which the request source terminal device originally belongs; and first control means for executing subsequent call origination/termination control associated with the request source terminal device on the basis of the information stored in said first storage means, and wherein said terminal device comprises:

request transmission means for transmitting the temporary use registration request to said radio control apparatus;

second storage means for, when the use permission information is supplied from said radio control apparatus in response to the transmitted temporary use registration request, storing the first terminal identification information included in the use permission information together with a system identification number of said system; and second control means for executing subsequent call origination/termination control of an own terminal device in said system on the basis of the information stored in said second storage means, said own terminal device originally belonging to said system, wherein when a call termination request is received from the different network system, said first control means compares terminal identification information of a destination included in the call termination request with termination identification information of a home system, and converts the terminal identification information of the destination into the terminal identification information of the home system to perform call termination processing when the two pieces of information coincide with each other.

25. A system according to claim 24, wherein said radio control apparatus further comprises means for transmitting, from the base station, message information indicating if a temporary use registration request from the terminal device can be accepted, and said request transmission means of said terminal device receives the message information and checks based on the message information if the temporary use registration request is permitted, and transmits the temporary use registration request to said radio control apparatus only when it is determined that the temporary use registration request is permitted.

26. A system according to claim 24, wherein said radio control apparatus further comprises authentication means for verifying if the request source terminal device satisfies a condition for using the own system when the temporary use registration request is received from said terminal device, and supplying the use permission information to the request source terminal device only when the use condition is satisfied.

27. A system according to claim 24, wherein said radio control apparatus further comprises determination means for determining based on an operation state of the own system if the temporary use registration request from said terminal device is permitted, and said monitoring means accepts the temporary use registration request from said terminal device only when said determination means determines that the temporary use registration request from said terminal device is permitted.

28. A system according to claim 27, wherein said determination means monitors a traffic of the own system, and determines based on the traffic if the temporary use registration request from said terminal device is permitted.

29. A system according to claim 27, wherein when said plurality of base stations form a plurality of small areas that divide the service area, said determination means comprises means which pre-stores area blocking information indicating if the temporary use registration request from said terminal device is permitted in correspondence with each of the plurality of small areas, and determines based on the area blocking information stored in said means if the temporary use registration request from said terminal device is permitted.

30. A system according to claim 27, wherein when said plurality of base stations form a plurality of small areas that divide the service area, said determination means monitors traffics of the plurality of small areas, and determines based on the traffics in units of small areas if the temporary use registration request from said terminal device is permitted.

31. A system according to claim 27, wherein said determination means comprises means which pre-stores time blocking information indicating if the temporary use registration request from said terminal device is permitted in correspondence with each of a plurality of time zones, and determines based on the time blocking information stored in said means if the temporary use registration request from said terminal device is permitted.

32. A system according to claim 24, wherein said radio control apparatus further comprises use registration canceling means for checking if a use canceling condition of the terminal device from which the temporary use registration request has been accepted is satisfied, and deleting the stored information corresponding to the terminal device for which the use canceling condition has been satisfied from said first storage means.

* * * * *